United States Patent
Reubenstein et al.

(10) Patent No.: US 10,193,868 B2
(45) Date of Patent: Jan. 29, 2019

(54) SAFE SECURITY PROXY

(71) Applicant: BAE SYSTEMS INFORMATION AND ELECTRONIC SYSTEMS INTEGRATION INC., Nashua, NH (US)

(72) Inventors: Howard B. Reubenstein, Bedford, MA (US); Gregory Sullivan, Auburndale, MA (US); David Wittenberg, Watertown, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 203 days.

(21) Appl. No.: 15/260,726

(22) Filed: Sep. 9, 2016

(65) Prior Publication Data

US 2017/0142072 A1    May 18, 2017

Related U.S. Application Data

(60) Provisional application No. 62/216,662, filed on Sep. 10, 2015.

(51) Int. Cl.
| | |
|---|---|
| *H04L 29/08* | (2006.01) |
| *H04L 12/24* | (2006.01) |
| *H04L 29/06* | (2006.01) |
| *G06F 21/55* | (2013.01) |
| *G06F 21/00* | (2013.01) |
| *G06F 9/4401* | (2018.01) |

(52) U.S. Cl.
CPC ........ *H04L 63/0281* (2013.01); *G06F 21/554* (2013.01); *H04L 63/1441* (2013.01); *G06F 9/4401* (2013.01)

(58) Field of Classification Search
CPC ............... G06F 9/1441; H04L 63/0281; H04L 63/1441
See application file for complete search history.

(56) References Cited

U.S. PATENT DOCUMENTS

| | | | |
|---|---|---|---|
| 2006/0015715 A1* | 1/2006 | Anderson | ........... H04L 63/1408 713/154 |
| 2006/0085839 A1* | 4/2006 | Brandt | ............... G05B 19/4185 726/2 |

(Continued)

OTHER PUBLICATIONS

Adams, William Joseph, George C. Hadjichristofi, and N. J. Davis. "Calculating a node's reputation in a mobile ad hoc network." Performance, Computing, and Communications Conference, 2005. IPCCC 2005. 24th IEEE International. IEEE, 2005. (Year: 2005).*

(Continued)

*Primary Examiner* — Michael Simitoski
(74) *Attorney, Agent, or Firm* — Davis & Bujold, PLLC

(57) ABSTRACT

The system and method for protecting multiple networked enclaves each having one or more insecure machines. The system may include an attack detector as part of a secure node (e.g., SAFE node) proxy. The system may include an attack detector external to the proxy. The proxy may support multiple detectors and its actions may include isolating an insecure machine, cleansing an insecure machine, or tattling on (impugning the reputation of) an insecure machine.

18 Claims, 4 Drawing Sheets

(56) References Cited

U.S. PATENT DOCUMENTS

| | | | | |
|---|---|---|---|---|
| 2010/0023783 | A1* | 1/2010 | Ambady | G06F 21/10 713/193 |
| 2010/0274621 | A1* | 10/2010 | Diwakar | G06Q 10/06 705/80 |
| 2011/0055549 | A1* | 3/2011 | El Khayat | H04L 45/04 713/150 |
| 2011/0239295 | A1* | 9/2011 | Sorge | H04L 51/12 726/22 |
| 2013/0268994 | A1* | 10/2013 | Cooper | H04L 63/10 726/1 |
| 2013/0298219 | A1* | 11/2013 | Byrkit | H04L 63/1416 726/12 |
| 2015/0350038 | A1* | 12/2015 | Mohan | G06F 21/57 709/224 |
| 2016/0127475 | A1* | 5/2016 | PalChaudhuri | H04L 67/28 709/203 |

OTHER PUBLICATIONS

Figueroa, Michael, Karen Uttecht, and Jothy Rosenberg. "A SOUND approach to security in mobile and cloud-oriented environments." Technologies for Homeland Security (HST), 2015 IEEE International Symposium on. IEEE, 2015. (Year: 2015).*

Frazier, Gregory, et al. "Incentivizing responsible networking via introduction-based routing." International Conference on Trust and Trustworthy Computing. Springer, Berlin, Heidelberg, 2011. (Year: 2011).*

McCoy, Damon, Doug Sicker, and Dirk Grunwald. "A mechanism for detecting and responding to misbehaving nodes in wireless networks." Sensor, Mesh and Ad Hoc Communications and Networks, 2007. SECON'07. 4th Annual IEEE Communications Society Conference on. IEEE, 2007. (Year: 2007).*

Parvin, Sazia, Dong Seong Kim, and Jong Sou Park. "Towards survivable sensor networks using self-regenerative rejuvenation and reconfiguration." Computational Intelligence and Security Workshops, 2007. CISW 2007. International Conference on. IEEE, 2007. (Year: 2007).*

Refaei, M. Tamer, et al. "A reputation-based mechanism for isolating selfish nodes in ad hoc networks." Mobile and Ubiquitous Systems: Networking and Services, 2005. MobiQuitous 2005. The Second Annual International Conference on. IEEE, 2005. (Year: 2005).*

Strasser, Mario, and Harald Vogt. "Autonomous and distributed node recovery in wireless sensor networks." Proceedings of the fourth ACM workshop on Security of ad hoc and sensor networks. ACM, 2006. (Year: 2006).*

Fahey et al., "Benefits of Deploying Inherently Secure Nodes Within a Distributed System", IEEE Software Technology Conference, Oct. 15, 2015.

Prakash et al., "Empirical Game-Theoretic Analyis for Moving Target Defense", Computer Science and Engineering, University of Michigan, Oct. 12, 2015.

Javanmardi et al., : FR TRUST: A Fuzzy Reputation Based Model for Trust Management in Semantic P2P Grids, International Journal of Grid and Utility Computing, vol. 6, Issue 1, pp. 57-66, Dec. 2015.

* cited by examiner

SAFE SECURITY PROXY

CROSS REFERENCE TO RELATED APPLICATIONS

This application claims the benefit of U.S. Provisional Application No. 62/216,662, filed Sep. 10, 2015, the content of which is incorporated by reference herein in its entirety.

STATEMENT OF GOVERNMENT INTEREST

This disclosure was made with United States Government support under Contract No. FA8650-10-C-7090 awarded by the Department of the Air Force. The United States Government has certain rights in this disclosure.

FIELD OF THE DISCLOSURE

The present disclosure relates to computer security measures and more particularly to secure computing technology that provides resilience and safety in a heterogeneous environment using inherently secure nodes within a distributed system.

BACKGROUND OF THE DISCLOSURE

Existing computer security solutions are based on "patch-and-pray" and layers upon layers of equally insecure and partially effective protections. Some current solutions include network firewalls which try to repel attacks from the outside and/or inhibit communication from "inside" to the outside world. It is said that these systems are "hard on the outside and soft on the inside." Once compromised, firewalls do not typically provide any additional situational awareness or remediation.

Other existing solutions require installing software on a machine such as a server or user computing device that becomes part of the computing base of a machine and may increase the attack surface of a machine. These products are not immune from cyber-attack and also add complexity to the network devices and tend to decrease operational efficiency. While some of these products may provide a level of protection they do not provide any sort of independent cyber situational awareness.

SUMMARY OF THE DISCLOSURE

It has been recognized that the current computer infrastructure is inherently insecure, causing cyberattacks to be a major concern to both commercial and defense organizations. Computing hosts use an architecture that was designed when 8 kB was a lot of memory and internet connectivity was over a decade away. The world has changed, but our computer architectures have not. With the underlying hosts having minimal security, the systems built out of them are bound to be insecure.

One aspect of the present disclosure is the use of secure nodes in a cyber situational awareness subsystem. The SAFE (Semantically Aware Foundation Environment) platform is one emnbodiment of a secure node as used in the present disclosure. In certain embodiments, the system is designed from a clean slate to be fundamentally secure. In certain embodiments, deployment of a secure node-based security proxy can provide significant computational resiliency and permit a system to "compute through" a cyber-attack.

Another aspect of the present disclosure is a method of protecting at least one networked enclave, comprising, providing one or more proxy nodes per networked enclave; providing one or more normal nodes per networked enclave; monitoring a state of the one or more proxy nodes or normal nodes, wherein the one or more proxy nodes and normal nodes have reputations and states, where said states include at least healthy, compromised, and off-line; detecting an attack on the one or more proxy nodes or normal nodes; isolating the one or more attacked nodes; cleansing the one or more attacked nodes by sending a reboot message to the one or more attacked nodes; and rebooting the one or more attacked nodes to restore the state of the one or more attacked nodes to healthy.

One embodiment of the method of protecting the networked enclave further comprises reducing the reputation of the one or more attacked nodes. One embodiment of the method of protecting the networked enclave further comprises reporting the attack to the one or more proxy nodes.

Another embodiment of the method of protecting the networked enclave further comprises increasing the reputation of the one or more attacked nodes after the attacked node has been rebooted. One embodiment of the method of protecting the networked enclave further comprises controlling communication between one or more proxy or normal nodes by requiring the one or more proxy nodes or normal nodes to have a reputation above a threshold value, wherein the reputation of a node is decreased after an attack, and is increased following a reboot or following a period of time between attacks.

One embodiment of the method of protecting the networked enclave is wherein at least one of the proxy nodes is a secure proxy node. One embodiment of the method of protecting the networked enclave is wherein the secure proxy node is in the form of a dongle installed on a machine.

Another aspect of the present disclosure is a cyber situational awareness subsystem for providing uncompromised host health status comprising, one or more networked enclaves; one or more nodes present in each of the one or more networked enclaves, wherein the one or more nodes are normal nodes or proxy nodes and wherein the one or more normal nodes and proxy nodes have a reputation and a state; the one or more nodes being configured to communicate with others of the one or more nodes based on the respective reputation and state; one of the one or more proxy nodes being a secure proxy node; and one or more attack detectors configured to reboot the one or more nodes after an attack has been detected on the one or more nodes.

One embodiment of the cyber situational awareness subsystem is wherein the one or more attack detectors are external. One embodiment of the cyber situational awareness subsystem is wherein communication between the one or more normal nodes and proxy nodes requires facilitation by a proxy node.

Another embodiment of the cyber situational awareness subsystem is wherein communication between the one or more nodes occurs only when the one or more nodes have reputations above a threshold value, wherein the reputation of a node is decreased after an attack, and is increased following a reboot or following a period of time between attacks.

One embodiment of the cyber situational awareness subsystem is wherein communication between the one or more nodes occurs between proxies of different enclaves.

One embodiment of the cyber situational awareness subsystem is wherein the secure proxy node is in the form of a dongle installed on a machine. One embodiment of the cyber situational awareness subsystem is wherein the state includes at least healthy, compromised and offline.

Another aspect of the present disclosure is a computer program product, tangibly stored on a computer-readable medium, the product comprising instructions operable to cause a programmable processor to perform cyber situational awareness operations comprising identifying one or more proxy nodes per a networked enclave; identifying one or more normal nodes per the networked enclave; monitoring a state of the one or more proxy nodes or normal nodes, wherein the one or more proxy nodes and normal nodes have reputations and states, where said states include at least healthy, compromised, and off-line; detecting an attack on the one or more proxy nodes or normal nodes; isolating the one or more attacked nodes; cleansing the one or more attacked nodes by sending a reboot message to the one or more attacked nodes; and rebooting the one or more attacked nodes to restore the state of the one or more attacked nodes to healthy.

One embodiment of the computer program product further comprises instructions for reducing the reputation of the one or more attacked nodes. One embodiment of the computer program product further comprises instructions for reporting the attack to the one or more proxy nodes.

Another embodiment of the computer program product further comprises instructions for increasing the reputation of the one or more attacked nodes after the attacked node has been rebooted.

One embodiment of the computer program product further comprises instructions for controlling communication between one or more proxy or normal nodes by requiring the one or more proxy nodes or normal nodes to have a reputation above a threshold value, wherein the reputation of a node is decreased after an attack, and is increased following a reboot or following a period of time between attacks.

One embodiment of the computer program product is wherein the secure proxy node is in the form of a dongle installed on a machine.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are provided to illustrate the principles of the disclosure.

DETAILED DESCRIPTION OF THE DISCLOSURE

Figure 1:
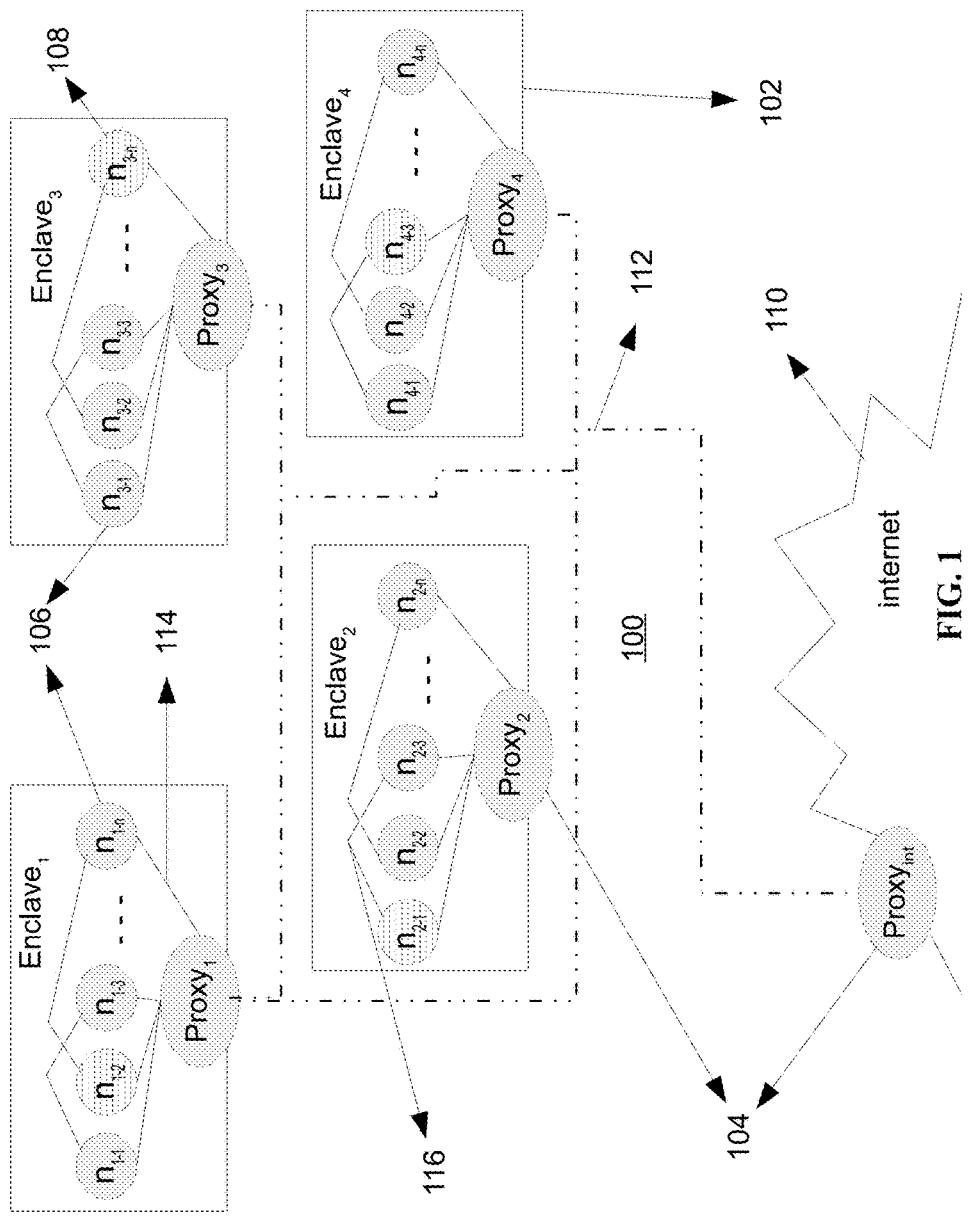
FIG. 1 shows one embodiment of the present disclosure with a high level view of a generic network of enclaves having one proxy node per enclave.

In contrast to conventional computer protection schemes, the secure computing technology of the present disclosure provides resilience and safety in a heterogeneous environment, e.g., as a monitor and/or as a controller. Simulations have demonstrated that judicious use of inherently secure computer hosts can provide a significant increase in the overall reliability of a network of heterogeneous machines.

In certain embodiments, the SAFE-like proxy of the present disclosure uses a fundamentally secure computing device to provide protection for an enclave of one or more contemporary (i.e., insecure) computing devices. In certain embodiments, use of the SAFE-like proxy increases the reliability and availability of the protected set of computers.

In one embodiment of the present disclosure, the system evaluates the benefits of using "inherently secure" (e.g. SAFE) nodes in a distributed system. In certain embodiments, strategically deploying inherently secure nodes to perform security situational awareness or compromise situational awareness tasks is better than implementing a random distribution of inherently secure nodes, which is in turn better than not deploying any inherently secure nodes.

In certain embodiments, placing security-related monitors, such as cyber situational awareness subsystems, on secure node (e.g. SAFE) processors (as opposed to on vulnerable conventional systems) dramatically increases the overall health of a distributed system. In certain embodiments, the distributed system is protected by a combination of network-based and host-based detection and remediation infrastructure.

In certain embodiments, nodes are placed in the network to communicate information about threatening nodes, thus enabling the entire network to act as an attack detector instead of requiring each node to detect all attacks without help.

One aspect of the present disclosure was tested using a model parameterized according to the accuracy of attack detection, the likelihood of attack success, and the ratio of security-related resources to general computation resources. In certain embodiments, in order to model and analyze attack propagation within the network, a generalized network simulation tool with flexible parameterization was used. In certain embodiments, the simulation parameters were general enough that the results can be extended to a wide range of security frameworks that attempt to detect and adapt to security incidents.

In one embodiment, the model assumed that once a node was attacked, it became an attacker. In certain embodiments, when a node detects another node issuing attacks, it orders the attacking node to reboot to an uncorrupted state, vulnerable to future attacks. In an uncorrupted state, a node is vulnerable to being attacked again. In certain embodiments, the node is rebooted to the same state it started in before it was attacked.

One embodiment of the present disclosure uses security processors as a gateway node protecting each enclave of legacy computers as an interface between the computers and the network. In certain embodiments, this added security comes without any changes to the legacy computers. In certain embodiments, a secure node (e.g., SAFE node) network proxy is used as the gateway to each enclave of legacy computers. As demonstrated in simulation experiments, the security within a network of legacy computers further increased as the fraction of gateways that were inherently secure increased. In certain embodiments, this approach is an ideal application for an inherently secure architecture, as it requires only a network stack, and not a large amount of work to provide backwards compatibility as would be needed to replace the standard nodes. In other words, if you had to start over to get a secure computer (e.g., as SAFE did), you would end up with a computer without a software base. In certain embodiments, using a node as described herein as a gateway requires much less new software than using it as a general purpose computer. In certain embodiments, use of a low cost SAFE-like network proxy to protect each legacy computational node is a cost effective approach.

In certain embodiments of the present disclosure, the security infrastructure complements Applicant's own work on the Safety on Untrusted Network Devices (SOUND) system. The SOUND system improved upon Introduction-Based Routing (IBR) to manage network connections between nodes in a distributed system and between the distributed system and other networks.

In one embodiment of the present disclosure, a SAFE "dongle" is used between each computational node and the network. In certain embodiments, the system acts as a gateway or firewall for each node. This approach is cost-effective, as the dongles only have to run a network stack, rather than a full stack of applications which would be required if one were to use the SAFE nodes as the primary computation nodes. In another embodiment, using one SAFE node to protect many nodes (e.g., a 100 node enclave) provides significantly more resistance to attack.

In one embodiment, the cyber security system is based on IBR. In IBR, there can be no communication between two nodes until they are introduced. In certain embodiments, an introducer will only introduce nodes if both of them have good enough reputations. In certain embodiments, reputations are completely local, so, except for sending reports of attacks, there is no coordination of reputation between nodes.

In certain embodiments, the simulated distributed system of the present disclosure is divided into enclaves (e.g., each with one or more computing nodes) and each enclave has exactly one proxy (or gateway) node. In certain embodiments, proxy nodes represent security operations within an enclave. In certain embodiments, proxy nodes are candidates both for attack and for deployment on inherently secure nodes. In certain embodiments, all traffic into or out of the enclave passes through the proxy. In some embodiments, all nodes are connected to each other within an enclave. In certain embodiments, every proxy node is connected to every other proxy node. In some embodiments, there is no connection to the wider internet.

In some embodiments, any node can send a message to any other node based on an IP address. In certain embodiments, the message will be ignored unless a connection has been established. In certain embodiments, time is modeled in ticks and a node can send a message to any node it is physically connected to in one tick. In certain embodiments, messages cannot be forged. That is, the identity of the sender of a message (and the entire path the message took) is as it claims to be.

In one embodiment, the distributed system is divided into enclaves, and each enclave had one proxy node. In certain embodiments, proxies force a reboot (cleanup) of nodes that are deemed compromised. In certain embodiments, proxy nodes are consulted before establishing connections between nodes; thus proxy nodes can be used to adapt the network (by refusing to make connections) to account for compromised nodes.

Referring to FIG. 1, a high level view of a generic network of enclaves (100), with one proxy node per enclave is shown. In some embodiments, the distributed system is connected to the broader internet (110) via a proxy node (104). In certain embodiments, each enclave (102) has a plurality of nodes (106) (e.g., $n_{1-1}, n_{1-2}, n_{1-3}, \ldots n_{1-n}$). In other embodiments, there is one proxy (104) per enclave (102). In one example, each proxy (112) is in communication with every other proxy. FIG. 1 shows nodes with hatch marks as compromised (108). In certain embodiments, each node within an enclave is in communication with the other nodes within its enclave (116), either directly or indirectly. In certain embodiments, every node in an enclave is in direct communication with the proxy for that enclave (114).

In further embodiments, all nodes are sensors, to form a "fabric" of sensors, so the entire network acts as a distributed sensor. For the purposes of the model it was assumed that any attack would be detected at a particular node. In certain embodiments, the original version of the IBR protocol was used, whereas in another example, nodes did not communicate about other node's reputations.

In certain embodiments, the secure node approach applies to a wide range of security frameworks that attempt to detect and adapt to security incidents and in which some processes are more critical to overall system security than others. In one embodiment, health metrics are used that assume either a fixed number of time steps or that a steady state is reached after some burn-in. For reference, mean uptime is the average number of time steps for a node between successful attacks. Mean healthy nodes is defined herein as the average percentage of nodes in a "healthy" state when the system has reached steady state. Steady state means a state where the fraction of healthy nodes remains more or less constant. In certain embodiments, steady state does not imply that any particular node does not change state.

In one example, when an attack occurs, it can be characterized by two probabilities, the probability that the attack is detected by the network fabric, and the probability that the attack succeeds. In certain embodiments, the probability that the attack is detected by the network fabric is modeled as being detected by the node which was attacked. In other embodiments, any attack which is detected is assumed not to succeed. Furthermore, attack success can be modelled probabilistically because even if the hardware and software on the nodes is the substantially similar, there will be differences (such as software patched to different levels) that make host machines susceptible to different attacks, and there will be different users with passwords of varying strength, and with different susceptibilities to phishing, which will modify the likelihood of an attack's success as well.

In one embodiment of the present disclosure, the system explores a three-way relation in the following way: N×SimParams=>HealthMetrics, where N is the number and allocation strategy of inherently secure nodes, SimParams are parameters to the simulation, such as the likelihood of detection of an attack or the likelihood of attack success, and HealthMetrics are metrics, as discussed in the previous section, characterizing the health of the system given the distribution of secure nodes and the simulation parameters used. HealthMetrics are the percentage of nodes that are healthy in the steady state. Simulation parameters include, but are not limited to, the probability of detecting an attack, the probability of an attack compromising a node, the fraction of proxy nodes which are immune to attack, the enclave size and the number of enclaves.

In certain embodiments, for a given set of parameters (SimParams), adding inherently secure nodes (increasing N) can improve the metrics (HealthMetrics). In other embodiments, adding inherently secure nodes (increasing N) increases the ranges of parameters (SimParams) in which metrics (HealthMetrics) are in a reasonable range. For example, with P(detect|attack)=0.9 and no SAFE nodes, 74% of the nodes were healthy. In certain embodiments, if all the gateway nodes are SAFE nodes, a similar condition can be reached (e.g., the fraction of nodes that are healthy is 79%) even as P(detect|attack)=0.5. See, for example, Table 4.

In one embodiment of the present disclosure, every working node has its own gateway (e.g., the enclaves are of size 1). Simulations showed that if the probability of attack detection was about 30%, and the probability of an undetected attack successfully corrupting a node was about 30%, the steady state fraction of healthy (e.g., non-compromised) nodes ranges from about 12% (e.g., the system is essentially unusable) with no SAFE nodes; to about 49% (e.g., the system supports high priority computations) if about 15% of the nodes are SAFE; to about 91% (e.g., the system is within normal operational range) if about 50% of the nodes are SAFE nodes. In certain embodiments, the fraction of all the nodes which are SAFE-like is used, as opposed to the fraction of the gateways which are SAFE-like. In certain embodiments, focusing on the fraction of the gateways which are SAFE-like would double the fraction in the previous example.

In certain embodiments, the system addresses both "smart" and "dumb" attackers. As used herein, smart attackers take out proxies first. In certain embodiments, Frac SAFE is the fraction of proxy nodes which are immune to attack. Pdetect is the probability that an attack will be detected. Pcompromise is the probability that an attack which is not detected will compromise the attacked node. In one example, every enclave has exactly one proxy node, in addition to the clients listed, and all client nodes can be compromised. In certain embodiments, the values are the fraction of the nodes which are HEALTHY in what appears to be a steady state, and the system enters a steady state in 100 or fewer ticks. In one study, the run continued for 1000 ticks to see if it indeed stayed steady.

In certain embodiments of the present disclosure, all runs have "offline time" (that is, the time between when a node gets a reset signal and when it finishes rebooting) of 5 ticks. In one example, all runs used a "one strike and you're out" rule for when to force a node to reboot. In certain embodiments, all runs used an "attack delay" (the time between attacks by a single node) of 2 ticks.

The following reported data is the average of 50 runs. In Tables 1 through 5 a plot of the fraction of healthy nodes at steady state as a function of Pdetect and the fraction of proxies which are secure (e.g., SAFE) nodes at different values of Pcompromise are shown. Most of the runs went for the full 1000 ticks allowed, but a few ended in 10-20 ticks.

TABLE 1

$P_{Detect}$ vs. Frac SAFE nodes, 20 enclaves, 50 clients per enclave, $P_{Compromise} = 1.0$

| $P_{Detect}$ | Frac SAFE | | | | | |
|---|---|---|---|---|---|---|
| | 0 | 0.1 | 0.3 | 0.5 | 0.7 | 1.0 |
| 0.1 | 0.00 | 0.00 | 0.02 | 0.03 | 0.04 | 0.08 |
| 0.3 | 0.00 | 0.01 | 0.02 | 0.06 | 0.08 | 0.13 |
| 0.5 | 0.00 | 0.02 | 0.03 | 0.08 | 0.11 | 0.18 |
| 0.7 | 0.00 | 0.02 | 0.04 | 0.09 | 0.12 | 0.21 |
| 0.9 | 0.00 | 0.02 | 0.05 | 0.10 | 0.15 | 0.22 |

TABLE 2

$P_{Detect}$ vs. Frac SAFE nodes, 20 enclaves, 50 clients per enclave, $P_{Compromise} = 0.8$

| $P_{Detect}$ | Frac SAFE | | | | | |
|---|---|---|---|---|---|---|
| | 0 | 0.1 | 0.3 | 0.5 | 0.7 | 1.0 |
| 0.1 | 0.00 | 0.00 | 0.01 | 0.03 | 0.06 | 0.09 |
| 0.3 | 0.00 | 0.03 | 0.03 | 0.07 | 0.11 | 0.18 |
| 0.5 | 0.00 | 0.02 | 0.04 | 0.09 | 0.14 | 0.22 |
| 0.7 | 0.00 | 0.02 | 0.07 | 0.11 | 0.19 | 0.27 |
| 0.9 | 0.00 | 0.02 | 0.08 | 0.13 | 0.20 | 0.28 |

Next, $P_{compromise}$ and $P_{detect}$ were assessed to find a relationship. In certain embodiments, $P_{compromise}$ and $P_{detect}$ are combined into one measure of hardness. Table 6 shows such a relationship. While there are some anomalous points, in general we see the expected relationship that the higher $P_{compromise}$ is, the fewer nodes are healthy, and the higher $P_{detect}$ is, the more nodes are healthy.

TABLE 3

$P_{Detect}$ vs. Frac SAFE nodes, 20 enclaves, 50 clients per enclave, $P_{Compromise} = 0.6$

| $P_{Detect}$ | Frac SAFE | | | | | |
|---|---|---|---|---|---|---|
| | 0 | 0.1 | 0.3 | 0.5 | 0.7 | 1.0 |
| 0.1 | 0.00 | 0.00 | 0.02 | 0.07 | 0.09 | 0.12 |
| 0.3 | 0.00 | 0.05 | 0.08 | 0.18 | 0.17 | 0.23 |
| 0.5 | 0.04 | 0.03 | 0.08 | 0.16 | 0.20 | 0.31 |
| 0.7 | 0.02 | 0.02 | 0.13 | 0.18 | 0.29 | 0.37 |
| 0.9 | 0.00 | 0.07 | 0.21 | 0.25 | 0.32 | 0.43 |

TABLE 4

$P_{Detect}$ vs. Frac SAFE nodes, 20 enclaves, 50 clients per enclave, $P_{Compromise} = 0.3$

| $P_{Detect}$ | Frac SAFE | | | | | |
|---|---|---|---|---|---|---|
| | 0 | 0.1 | 0.3 | 0.5 | 0.7 | 1.0 |
| 0.1 | 0.06 | 0.18 | 0.21 | 0.17 | 0.17 | 0.32 |
| 0.3 | 0.20 | 0.16 | 0.34 | 0.41 | 0.53 | 0.61 |
| 0.5 | 0.32 | 0.52 | 0.51 | 0.64 | 0.75 | 0.79 |
| 0.7 | ** | 0.62 | 0.79 | 0.83 | 0.88 | 0.85 |
| 0.9 | 0.74 | 0.83 | 0.87 | 0.90 | 0.91 | 0.92 |

** 22 runs ended before 30 ticks. Ran for 2000 ticks, 30 runs ended before 90 ticks. After 1000 ticks, the fraction HEALTHY dropped steadily. Ran it for 2000 ticks - it was dropping at 1000 ticks, but may have steadied at 0.60 at 2000 ticks.

TABLE 5

$P_{Detect}$ vs. Frac SAFE nodes, 20 enclaves, 50 clients per enclave, $P_{Compromise} = 0.1$

| Pdetect | Frac SAFE | | | | | |
|---|---|---|---|---|---|---|
| | 0 | 0.1 | 0.3 | 0.5 | 0.7 | 1.0 |
| 0.1 | 0.40 | 0.73 | 0.75 | 0.82 | *** | 0.93 |
| 0.3 | 1.00 | 1.00 | 1.00 | 1.00 | 1.00 | 1.00 |
| 0.5 | | | | | | |
| 0.7 | | | | | | |
| 0.9 | | | | | | |

*** no steady state. After 1000 ticks, it was at 0.89, but dropping 0.01 every 200 or so ticks.

TABLE 6

$P_{compromise}$ vs. $P_{detect}$, 20 enclaves, 50 clients per enclave, Frac SAFE = 0.5

| | Frac SAFE | | | | |
|---|---|---|---|---|---|
| $P_{Detect}$ | 0 | 0.1 | 0.3 | 0.5 | 0.7 |
| 0.1 | 0.82 | 0.16 | 0.06 | 0.03 | 0.03 |
| 0.3 | 1.00 | 0.40 | 0.18 | 0.06 | 0.06 |
| 0.5 | 1.00 | 0.63 | 0.15 | 0.09 | 0.07 |
| 0.7 | 1.00 | 0.83 | 0.18 | 0.12 | 0.09 |
| 0.9 | 1.00 | 0.18 | 0.24 | 0.14 | 0.10 |

It appears from Table 7 and Table 4 that with a fixed number of SAFE nodes, it may not matter if you have 10 enclaves of 100 clients each rather than 20 enclaves of 50 clients each. In Tables 8 through 11 the effect of different enclave sizes is shown. In these tables, EN means number of enclaves (E), and number of nodes per enclave (N). In one embodiment, SAFE is used as a dongle between a computer and its network. Tables 12 through 15 correspond to that case.

In certain embodiments, for a given set of parameters SimParams, adding inherently secure nodes (increasing N) can improve the metrics HealthMetrics. For example, as one can see from Table 13, with no SAFE nodes, and parameter P(detect|attack)=0.7 a steady state of 42% healthy nodes was reached. In certain embodiments, adding inherently secure nodes increases the percentage of healthy nodes in the steady state to 85%. Note that this requires one safe node for every hundred computing nodes, so the cost involved is modest.

Tables 16 through 20 show the same data as tables 1 through 5, but holding $P_{Detect}$ constant for each table while varying $P_{Compromise}$.

TABLE 7

Frac SAFE nodes vs. $P_{Detect}$, 10 enclaves, 100 clients per enclave, Frac Safe = 0.3 $P_{Compromise}$ = 0:3

| Frac SAFE | 0 | 0.2 | 0.6 | 1.0 |
|---|---|---|---|---|
| $P_{Detect}$ | | | | |
| 0.1 | 0.08 | 0.16 | 0.19 | 0.32 |
| 0.3 | 0.28 | 0.30 | 0.43 | 0.60 |
| 0.5 | 0.37 | 0.41 | 0.64 | 0.77 |
| 0.7 | 0.42 | 0.63 | 0.88 | 0.85 |
| 0.9 | **** | 0.85 | 0.95 | 0.92 |

**** No equilibrium. was still dropping at 1000 ticks (where the value was 0.68).

TABLE 8

$P_{Detect}$ vs. enclave size, all proxies SAFE, $P_{Compromise}$ = 0:3

| $P_{Detect}$ | 0.1 | 0.3 | 0.5 | 0.7 | 0.9 |
|---|---|---|---|---|---|
| E/N | | | | | |
| 1/254 | 0.36 | 0.74 | 0.94 | 1.00 | 1.00 |
| 10/100 | 0.33 | 0.60 | 0.77 | 0.84 | 0.92 |
| 20/50 | 0.32 | 0.61 | 0.79 | 0.85 | 0.92 |
| 50/20 | 0.32 | 0.62 | 0.80 | 0.89 | 0.93 |
| 100/10 | 0.37 | 0.64 | 0.82 | 0.94 | 0.95 |
| 200/5 | 0.43 | 0.74 | 0.88 | 0.95 | 0.98 |
| 255/1 | 0.77 | 0.92 | 0.99 | 1.00 | 1.00 |

TABLE 9

$P_{Detect}$ vs. enclave size, all proxies SAFE, $P_{Compromise}$ = 0:5

| $P_{Detect}$ | 0.1 | 0.3 | 0.5 | 0.7 | 0.9 |
|---|---|---|---|---|---|
| E/N | | | | | |
| 1/254 | 0.17 | 0.36 | 0.56 | 0.65 | 0.70 |
| 10/100 | 0.16 | 0.29 | 0.41 | 0.48 | 0.48 |
| 20/50 | 0.17 | 0.34 | 0.42 | 0.49 | 0.49 |
| 50/20 | 0.17 | 0.32 | 0.41 | 0.49 | 0.58 |
| 100/10 | 0.23 | 0.37 | 0.48 | 0.53 | 0.60 |
| 200/5 | 0.32 | 0.43 | 0.57 | 0.61 | 0.66 |
| 255/1 | 0.61 | 0.73 | 0.82 | 0.90 | 0.94 |

TABLE 10

$P_{Detect}$ vs. enclave size, no SAFE proxies, $P_{Compromise}$ = 0:3

| $P_{Detect}$ | 0.1 | 0.3 | 0.5 | 0.7 | 0.9 |
|---|---|---|---|---|---|
| E/N | | | | | |
| 1/254 | 0.18 | 0.20 | 0.53 | 0.93 | 0.98 |
| 10/100 | 0.08 | 0.28 | 0.37 | 0.42 | ***** |
| 20/50 | 0.06 | 0.20 | 0.32 | 0.42 | 0.75 |
| 50/20 | 0.08 | 0.13 | 0.42 | 0.50 | 0.70 |
| 100/10 | 0.03 | 0.32 | 0.40 | 0.58 | 0.63 |
| 200/5 | 0.10 | 0.20 | 0.28 | 0.57 | 0.72 |
| 255/1 | 0.03 | 0.17 | 0.45 | 0.68 | 0.87 |

***** No equilibrium in first 1000 ticks. At tick 1000, the value was 0.68, and dropping.

TABLE 11

$P_{Detect}$ vs. enclave size, no SAFE proxies, $P_{Compromise}$ = 0:5

| $P_{Detect}$ | 0.1 | 0.3 | 0.5 | 0.7 | 0.9 |
|---|---|---|---|---|---|
| E/N | | | | | |
| 1/254 | 0.02 | 0.03 | 0.06 | 0.12 | 0.17 |
| 10/100 | 0.00 | 0.03 | 0.08 | 0.07 | 0.12 |
| 20/50 | 0.02 | 0.00 | 0.02 | 0.08 | 0.12 |
| 50/20 | 0.00 | 0.07 | 0.03 | 0.07 | 0.07 |
| 100/10 | 0.00 | 0.00 | 0.02 | 0.09 | 0.09 |
| 200/5 | 0.00 | 0.00 | 0.04 | 0.07 | 0.11 |
| 255/1 | 0.00 | 0.00 | 0.07 | 0.12 | 0.27 |

TABLE 12

$P_{Detect}$ vs. frac SAFE nodes, 254 enclaves, 1 node per enclave $P_{Compromise}$ = 1.0

| | Frac SAFE | | | | | |
|---|---|---|---|---|---|---|
| $P_{Detect}$ | 0 | 0.1 | 0.3 | 0.5 | 0.7 | 1.0 |
| 0.1 | 0.00 | 0.05 | 0.17 | 0.28 | 0.38 | 0.53 |
| 0.3 | 0.00 | 0.07 | 0.19 | 0.31 | 0.42 | 0.58 |
| 0.5 | 0.00 | 0.07 | 0.21 | 0.33 | 0.46 | 0.62 |
| 0.7 | 0.09 | 0.22 | 0.37 | 0.37 | 0.48 | 0.64 |
| 0.9 | 0.00 | 0.11 | 0.26 | 0.38 | 0.51 | 0.68 |

TABLE 13

$P_{Detect}$ vs. frac SAFE nodes, 254 enclaves,
1 node per enclave $P_{Compromise} = 0.7$

|  | Frac SAFE | | | | | |
|---|---|---|---|---|---|---|
| $P_{Detect}$ | 0 | 0.1 | 0.3 | 0.5 | 0.7 | 1.0 |
| 0.1 | 0.02 | 0.06 | 0.18 | 0.29 | 0.39 | 0.57 |
| 0.3 | 0.00 | 0.08 | 0.21 | 0.33 | 0.47 | 0.63 |
| 0.5 | 0.00 | 0.11 | 0.26 | 0.41 | 0.53 | 0.71 |
| 0.7 | 0.03 | 0.14 | 0.31 | 0.43 | 0.59 | 0.75 |
| 0.9 | 0.00 | 0.16 | 0.38 | 0.49 | 0.61 | 0.79 |

TABLE 14

$P_{Detect}$ vs. frac SAFE nodes, 254 enclaves,
1 node per enclave $P_{Compromise} = 0.5$

|  | Frac SAFE | | | | | |
|---|---|---|---|---|---|---|
| $P_{Detect}$ | 0 | 0.1 | 0.3 | 0.5 | 0.7 | 1.0 |
| 0.1 | 0.00 | 0.07 | 0.19 | 0.31 | 0.42 | 0.61 |
| 0.3 | 0.00 | 0.11 | 0.29 | 0.39 | 0.57 | 0.73 |
| 0.5 | 0.07 | 0.19 | 0.37 | 0.52 | 0.66 | 0.82 |
| 0.7 | 0.12 | 0.28 | 0.48 | 0.67 | 0.78 | 0.90 |
| 0.9 | 0.28 | 0.32 | 0.52 | 0.69 | 0.81 | 0.94 |

TABLE 15

$P_{Detect}$ vs. frac SAFE nodes, 254 enclaves,
1 node per enclave $P_{Compromise} = 0.3$

|  | Frac SAFE | | | | | |
|---|---|---|---|---|---|---|
| $P_{Detect}$ | 0 | 0.1 | 0.3 | 0.5 | 0.7 | 1.0 |
| 0.1 | 0.02 | 0.13 | 0.23 | 0.42 | 0.49 | 0.68 |
| 0.3 | 0.12 | 0.38 | 0.49 | 0.61 | 0.80 | 0.91 |
| 0.5 | 0.51 | 0.52 | 0.74 | 0.88 | 0.95 | 1.00 |
| 0.7 | 0.68 | 0.77 | 0.90 | 0.98 | 1.00 | 1.00 |
| 0.9 | 0.87 | 0.93 | 0.99 | 1.00 | 1.00 | 1.00 |

TABLE 16

$P_{Compromise}$ vs frac SAFE nodes, 20 Enclaves,
50 Clients/Enclaves, $P_{Detect} = 0.1$

|  | Frac SAFE | | | | | |
|---|---|---|---|---|---|---|
| $P_{Compromise}$ | 0 | 0.1 | 0.3 | 0.5 | 0.7 | 1.0 |
| 0.1 | 0.40 | 0.73 | 0.75 | 0.82 | 0.93 | |
| 0.3 | 0.06 | 0.18 | 0.21 | 0.17 | 0.17 | 0.32 |
| 0.6 | 0.00 | 0.00 | 0.02 | 0.07 | 0.09 | 0.12 |
| 0.8 | 0.00 | 0.00 | 0.01 | 0.03 | 0.06 | 0.09 |
| 1.0 | 0.00 | 0.00 | 0.02 | 0.03 | 0.04 | 0.08 |

TABLE 17

$P_{Compromise}$ vs frac SAFE nodes, 20 Enclaves,
50 Clients/Enclaves, $P_{Detect} = 0.3$

|  | Frac SAFE | | | | | |
|---|---|---|---|---|---|---|
| $P_{Compromise}$ | 0 | 0.1 | 0.3 | 0.5 | 0.7 | 1.0 |
| 0.1 | 1.00 | 1.00 | 1.00 | 1.00 | 1.00 | 1.00 |
| 0.3 | 0.20 | 0.16 | 0.34 | 0.41 | 0.53 | 0.61 |
| 0.6 | 0.00 | 0.05 | 0.08 | 0.18 | 0.17 | 0.23 |
| 0.8 | 0.00 | 0.03 | 0.03 | 0.07 | 0.11 | 0.18 |
| 1.0 | 0.00 | 0.01 | 0.02 | 0.06 | 0.08 | 0.13 |

TABLE 18

$P_{Compromise}$ vs frac SAFE nodes, 20 Enclaves,
50 Clients/Enclaves, $P_{Detect} = 0.5$

|  | Frac SAFE | | | | | |
|---|---|---|---|---|---|---|
| $P_{Compromise}$ | 0 | 0.1 | 0.3 | 0.5 | 0.7 | 1.0 |
| 0.1 | 1.00 | 1.00 | 1.00 | 1.00 | 1.00 | 1.00 |
| 0.3 | 0.32 | 0.52 | 0.51 | 0.64 | 0.75 | 0.79 |
| 0.6 | 0.04 | 0.03 | 0.08 | 0.16 | 0.20 | 0.31 |
| 0.8 | 0.00 | 0.02 | 0.07 | 0.11 | 0.19 | 0.27 |
| 1.0 | 0.00 | 0.02 | 0.03 | 0.08 | 0.11 | 0.18 |

TABLE 19

$P_{Compromise}$ vs frac SAFE nodes, 20 Enclaves,
50 Clients/Enclaves, $P_{Detect} = 0.7$

|  | Frac SAFE | | | | | |
|---|---|---|---|---|---|---|
| $P_{Compromise}$ | 0 | 0.1 | 0.3 | 0.5 | 0.7 | 1.0 |
| 0.1 | 1.00 | 1.00 | 1.00 | 1.00 | 1.00 | 1.00 |
| 0.3 | 0.62 | 0.79 | 0.83 | 0.88 | 0.85 | |
| 0.6 | 0.02 | 0.02 | 0.13 | 0.18 | 0.29 | 0.37 |
| 0.8 | 0.00 | 0.02 | 0.07 | 0.11 | 0.19 | 0.27 |
| 1.0 | 0.00 | 0.02 | 0.04 | 0.09 | 0.12 | 0.21 |

TABLE 20

$P_{Compromise}$ vs frac SAFE nodes, 20 Enclaves,
50 Clients/Enclaves, $P_{Detect} = 0.9$

|  | Frac SAFE | | | | | |
|---|---|---|---|---|---|---|
| $P_{Compromise}$ | 0 | 0.1 | 0.3 | 0.5 | 0.7 | 1.0 |
| 0.1 | 1.00 | 1.00 | 1.00 | 1.00 | 1.00 | 1.00 |
| 0.3 | 0.74 | 0.83 | 0.87 | 0.90 | 0.91 | 0.92 |
| 0.6 | 0.00 | 0.07 | 0.21 | 0.25 | 0.32 | 0.43 |
| 0.8 | 0.00 | 0.02 | 0.08 | 0.13 | 0.20 | 0.28 |
| 1.0 | 0.00 | 0.02 | 0.05 | 0.10 | 0.15 | 0.22 |

In certain embodiments, the model assumes all proxies are SAFE, and the enclave size is varied. In certain embodiments, the $P_{compromise}$ is varied from 0.1 to 1, and, the $P_{detect}$ is varied from 0.1 to 1.

Figure 2:
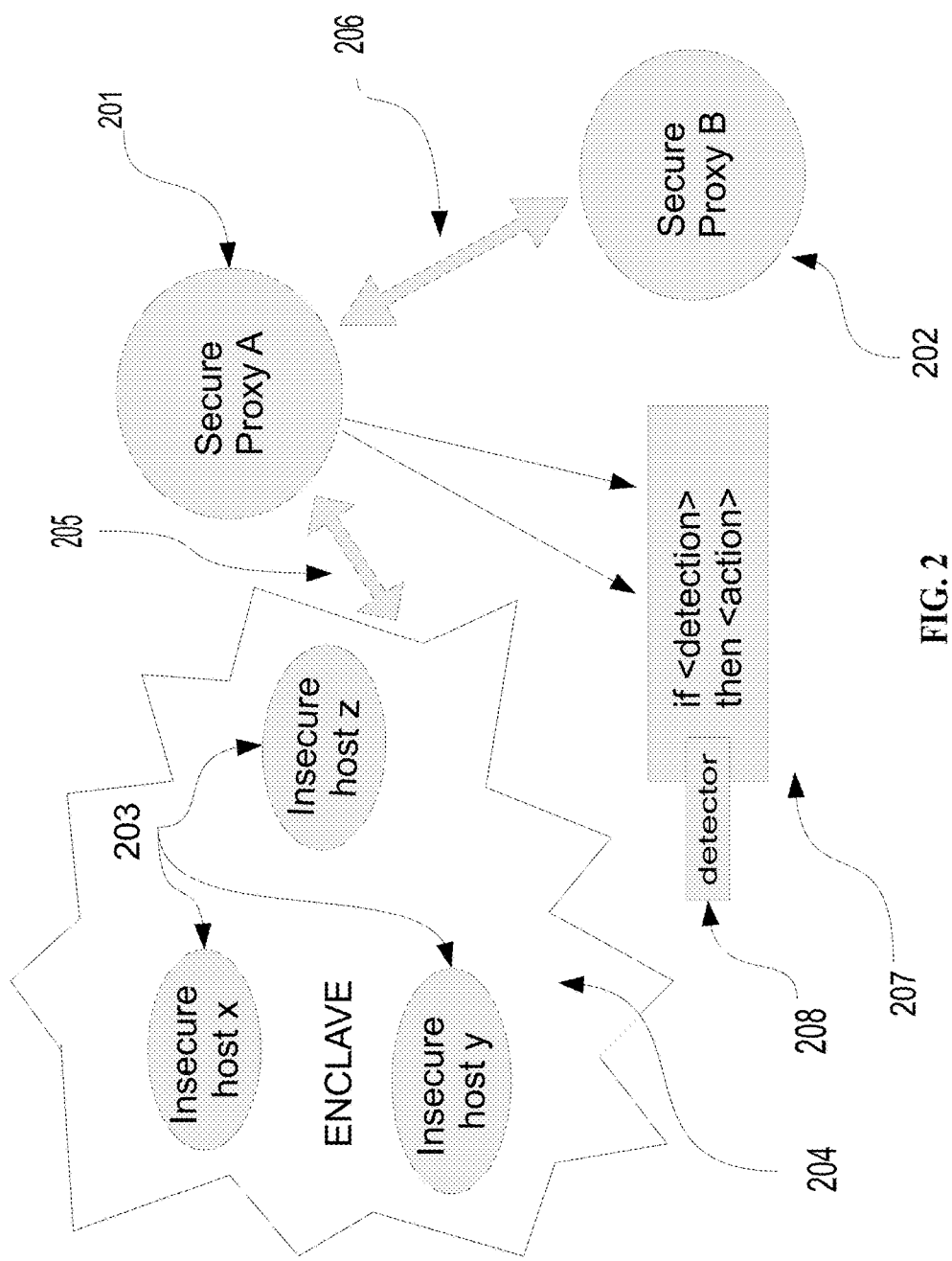
FIG. 2 shows a diagram of one embodiment of the secure node proxy of the present disclosure.

Referring to FIG. 2, a diagram of one embodiment of a secure node proxy of the present disclosure is shown. As shown, the secure SAFE proxy A (201) protects an enclave (204) of one or more insecure machines (203). In certain embodiments, secure proxy A (201) monitors the nodes via a communication channel (205) in its enclave (204). In one example, an attack detector can be part of the secure node (e.g., SAFE) proxy. In certain embodiments, an attack detector (208) can be external to the proxy but in communication with the proxy. In one embodiment, the proxy supports multiple detectors. In a further embodiment, the secure node proxy actions (207) include: isolating a machine, cleansing a machine, or tattling (impugning its reputation) on a machine. In one embodiment, secure node proxies (201), (202) maintain and share reputations via a communication channel (206) of the machines in their enclave. In one embodiment, isolation can be supported by using networks based on IBR while in another example, control actions of the SAFE-like proxy solution are out-of-band to the overall network traffic of the running applications (i.e., application functionality is not altered).

In certain embodiments of the present disclosure, a node's reputation ranges numerically from a minimum value to a maximum value. In some embodiments, a minimum value may be assigned to anode that is under attack. In one embodiment, a maximum value may be assigned to a node that is not only healthy, but that has been healthy for a certain period of time. In some embodiments, the threshold value at which other nodes will interact with a particular node is a configurable feature of the system and will vary based on the system's deployment. There is no particular threshold value that has meaning independent of the context of use.

The system allows for different probabilities that an attack will be detected depending on whether the target is healthy or already compromised (simplest: same number). For example, attacks on already compromised nodes can be detected if there is a separate attack detection mechanism outside of the nodes being attacked.

According to one example, in a single enclave and a single-proxy-per-enclave case, there was no mechanism to recover from a compromised proxy, so a countdown timer was added such that a compromised proxy will eventually reboot. In certain embodiments, in a cross-enclave case, a proxy may be rebooted by a proxy from another enclave, so there may be no need to include a timer in the cross-enclave case.

In an embodiment using IBR, every node has a set of nodes to which it has a priori connections. If the a priori connections to certain nodes are not connected, then these nodes will never be able to communicate with each other. In other examples, two nodes can communicate if they either have an a priori connection, or if they have been introduced. Once two nodes are introduced, they are said to be connected and can communicate with each other. In certain embodiments, if a node "A" wishes to communicate with a node "B," to which it is not connected, it must find a node "C" which is connected to both "A" and "B." In certain embodiments, the node then requests a connection from node "C." If "C" deems both "A" and "B" to have good reputations, it introduces them, and they are then connected and can communicate. In a further example, if "C" considers either "A" or "B" to be unsafe, it will refuse to introduce them. In other embodiments, if there is no node "C" which is connected to both "A" and "B," "A" can look for a path from "A" to "B," and ask for introductions from nodes along that path.

According to one embodiment, every node maintains a reputation for each node to which it is connected. A node which communicates with another node will give feedback to the node which introduced them after each communication. One way to maintain the reputations is to start with a positive reputation, and increase it slightly with each piece of positive feedback, and decrease it greatly with each piece of negative feedback. In certain embodiments, the node will perform an introduction if both nodes are over a pre-set reputation threshold. According to one example, every node is a priori connected to the proxy for its enclave, while in a further example, all the proxies a priori form a complete mesh, so it is not necessary for a path to be of length more than a few.

In certain embodiments, proxies are used as introducers, wherein, a connection between two nodes is established when one node sends a message to the proxy for the enclave of the other node requesting a connection. In certain embodiments, if the proxy grants the connection, the two nodes can communicate. For simplicity, here the disclosure does not distinguish between direct versus multi-hop communications. In certain embodiments, timeouts on connections may occur. In certain embodiments, attacks only take a single message.

In one embodiment of intra-enclave communication: a pair of nodes wishing to communicate within an enclave need to get a connection between them from a local proxy. Once established, intra-enclave packets may be node-to-node. In certain embodiments, the requirement to acquire connections allows the security system to isolate problem nodes as they are identified. In FIG. 1, wherein the dashed lines represent active intra-enclave connections (112).

In one embodiment of inter-enclave communication: packets into and out of an enclave go through proxies. To establish a connection between nodes in separate enclaves, all proxies are assumed to talk directly to each other. In one embodiment, there were three connections involved: node→proxy1→proxy2→node. In FIG. 1, the dashdot lines (112) represent proxy-to-proxy connections between enclaves. A security policy can isolate enclaves by not making connections between proxies.

In one example, when an attack is detected, the proxy of the target node is notified. In certain embodiments, when a proxy receives a notification of an attack from another enclave, it sends the report of the attack to the proxy for the originating enclave. If the receiving proxy is behaving normally, the offending attacker will eventually be rebooted. If the originating enclave keeps sending out attacks, the receiving enclave's proxy may elect to force a reboot of the entire foreign enclave. In other embodiments, a proxy may send a reboot message to another proxy. In certain embodiments, only proxy nodes can send reboot messages.

In one embodiment, the policy is established such that if a proxy receives a reboot message, it sends reboot messages to all of the nodes in its enclave. A proxy keeps track of reputations for both (1) nodes in its proxy and (2) proxies for other enclaves. In certain embodiments, a proxy may decide to send reboot messages either to (1) nodes in its enclave, or (2) proxies in other enclaves.

According to one embodiment, there are two types of nodes (proxy and regular), and each node is in one of at least three states: healthy, compromised, or offline. In simulation runs, Applicant began with one compromised regular node per enclave. In FIG. 1, the hatched nodes (108) represent compromised nodes. A healthy proxy node keeps track of a set of suspect nodes, forcing them to reboot when they are deemed compromised. Any node which is detected as the source of an attack is deemed to be compromised. In some embodiments, a compromised node selects a victim (proxy or regular node) from within its local enclave and attacks it.

An attack on a node is detected according to probability parameter P(detect|attacked). If the attack is detected, the attack is reported to the local proxy. In certain embodiments, if an attack is not detected, the node becomes compromised according to probability parameter P(compromise|attacked, not-detected). In certain embodiments, P(compromise|attacked)=0 for SAFE nodes. In certain embodiments, when a node is rebooting, it ignores all messages (though in the cross-enclave case, it might be rebooted while rebooting). Attacks on already compromised nodes can be detected if there is a separate attack detection mechanism outside of the nodes being attacked.

In certain embodiments, at each time step, the following actions may take place, according to the type of the node and its state. For simplicity, the following steps are described as in steps of the simulation. In other words, the messaging simulates behavior that would occur in a live deployment.

Healthy Regular: 1. If received attack message, flip P(detect|attacked-healthy) coin; 2. If attack detected, report (sender) to local proxy; 3. If attack not detected, flip P(compromise|attacked, not-detected) coin; and 4. If compromised, transition to compromised regular node.

Compromised Regular: 1. Check queue for attack message (assumes attacker cannot distinguish between healthy and compromised nodes; 2. If attacked, flip P(detect|attacked-compromised) coin; 3. If attacked and detected, report the sender to the local proxy; 4. Check for reboot message. If received, transition to offline mode, with countdown timer (node-reboot-time); and 5. Select a target node from local enclave. In certain embodiments, this could be a proxy according to some parameter (dumb attacker, P(proxy)=0; smarter attacker, P(proxy)=100). Send attack message to target. In certain embodiments, the ability to detect attacks on compromised nodes is modeled on there being some attack detection in the system that does not necessarily rely on the target being healthy.

Healthy Proxy: 1. Check for attack message; 2. If attacked, follow same coin-flipping sequence as regular nodes. In certain embodiments, the weights might be different for proxy nodes, e.g., if the proxy nodes are inherently secure nodes; 3. If attacked and did not detect and was compromised, transition to compromised proxy node, with countdown (possibly infinite) of time until reboot; 4. If attacked and did detect, decrease the reputation of sender (attacker); 5. Handle any incoming report (attacker) messages, by decreasing attacker reputations; 6. If any nodes now have low enough reputations, send them reboot messages. In certain embodiments, the simplest policy is 1 strike and you're out; and 7. For every node to which a reboot message was sent, reset that node's reputation.

Compromised Proxy: 1. Decrease time-until-reboot counter (unless infinite). If zero, transition to offline proxy, with count-down; and 2. Ignore all messages.

Offline Regular: 1. Ignore all messages; 2. Decrease timer; and 3. If timer at zero, transition to uncompromised.

Offline Proxy: 1. Decrease timer; and 2. If at zero, transition to healthy, reset all reputations.

In order to make the simulation more realistic, a compromised node was used to attempt to attack a node in another enclave. That is, when an attack propagated from one enclave to another, one new event of interest was added. In certain embodiments, a proxy may send a reboot message to another proxy. The policy in this example was that if a proxy receives a reboot message, it in turn sends reboot messages to all of the nodes in its enclave.

Following are some changes to the behavior of nodes to account for cross-enclave attacks in one embodiment of the present disclosure:

Healthy Regular: 1. after attack reporting, step; 2. Handle reboot message. May arrive if local proxy is being rebooted by an external enclave. Transition to offline mode with countdown(reboot-node-countdown); and 3. (other steps the same as in single-enclave case).

Compromised Regular: 1. (attack detection the same, reporting to local proxy if detection) (reboot the same); and 2. Selection of target now includes nodes in other enclaves.

Healthy Proxy: 1. (updated Step 4) If attacked and detected, (a) If attacker is local to this proxy's enclave, decrease attacker's reputation; (b) If attacker is from another enclave, decrease attacker's proxy's reputation; 2. Handle reboot message. Send reboot message to all nodes in this enclave. Transition to offline proxy with proxy-reboot-countdown; 3. (updated handling of report messages, Step 5 in single enclave case). For each incoming report(attacker) message, (a) If attacker is local to this proxy's enclave, decrease attacker's reputation; (b) If attacker is from another enclave, decrease attacker's proxy's reputation; (c) If attacker is from another enclave, send report(attacker) message to other enclave's proxy; and 4. (updated version of Step 6 in single enclave case). If any nodes have low enough reputations: (a) If bad node is in local enclave, send it a reboot message, and reset its reputation; and (b) If bad node is another proxy, send reboot message to that proxy, and reset its reputation.

Compromised Proxy: Don't need to countdown until reboot—let other proxies force a reboot; 1. (new initial step) Handle reboot message. Send reboot message to all nodes in this enclave. Transition to offline proxy with countdown; 2. (new) If attacked, flip P(detect|attacked-compromised) coin; and 3. (new) If attacked and detected, send message report (sender) to attacker's proxy.

Figure 3:
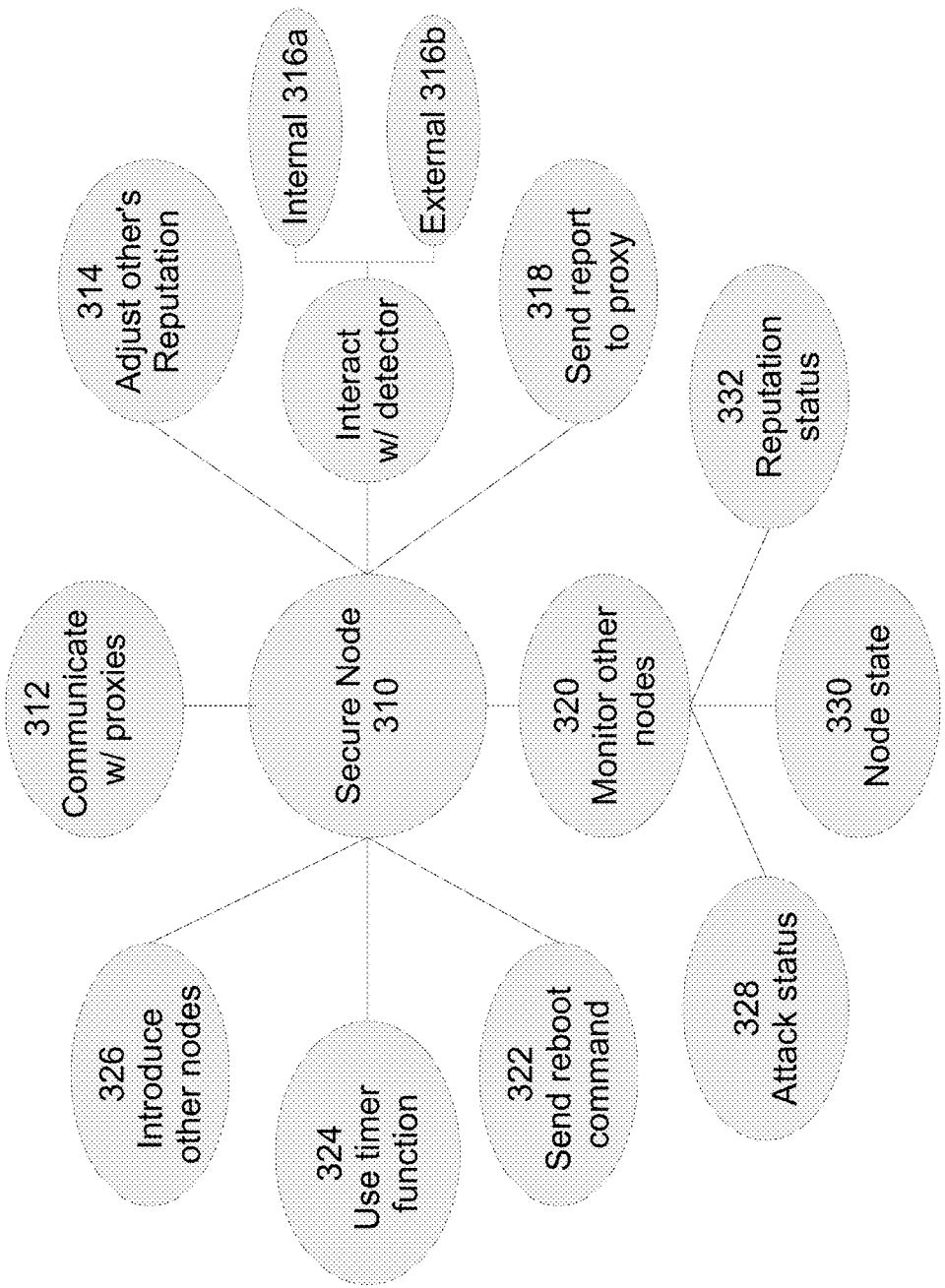
FIG. 3 shows a diagram of features embodied in one embodiment of a secure node according to the principles of the present disclosure.

Referring to FIG. 3, a diagram of features embodied in one embodiment of a secure node (310) according to the principles of the present disclosure is shown. More particularly, a secure node (310) may be a proxy node for an enclave. In certain embodiments, the secure node (310) may be incorporated into a dongle which is installed directly onto an insecure machine. A secure node (310) can communicate with other proxy nodes (312). In certain embodiments, a secure node (310) can adjust the reputations of other nodes (314). The secure node (310) can also interact with an external attack detector 16b. In certain embodiments, a secure node (310) comprises an internal attack detector 16a. The secure node (310) can send reports to proxy nodes (318). In certain embodiments, a secure node (310) can introduce nodes to each other (326), wherein introductions are based on multiples node's respective reputations. In certain embodiments, a secure node (310) comprises a timer function (324). A secure node (310) can send a reboot message to other nodes (322), monitor other nodes (320) to detect attacks (328), monitor the reputation status of other nodes (332), and/or monitor the state of other nodes (330).

Many complex software systems (e.g., complex DoD intelligence processing systems and the like) are deployed on a cluster of heterogeneous compute notes which reside behind a security perimeter. These systems rely on the security perimeter for protection and are often "hard on the outside and soft on the inside"—in other words if an attack makes it inside the security perimeter it can compromise the entire cluster. Similarly, "insider threats" can also do similar damage thus disabling the software from successfully completing its mission.

In a typical system the processing pipeline is deployed onto a cluster with an appropriate number of nodes which have been assigned to meet the computational demands of each processing pipeline stage. For example, for each stage of a N stage pipeline the processing of that stage is assigned to 1 or more nodes. Using the present disclosure, a proxy node is paired with each node in the cluster. In certain embodiments, this pairing is via a dongle. The proxies—as described in the performance tables—have the effect of limiting the spread of any malicious software attacks. In the best cases, the outbreak is contained. In some embodiments, this is done by lowering the infected node(s) reputations to inhibit those nodes from establishing new connections and spreading the infection. Thus, the network is no longer "soft on the inside" and continues computation to complete its mission in one of the following manners: 1. The application remains operational but performance may be degraded due to loss of the compromised nodes; 2. The application remains operational but performance is temporarily degraded while the compromised nodes are cleansed/rebooted; 3. The application remains operational at full performance making use of spare computational nodes that are swapped into service to replace any compromised nodes.

Figure 4:
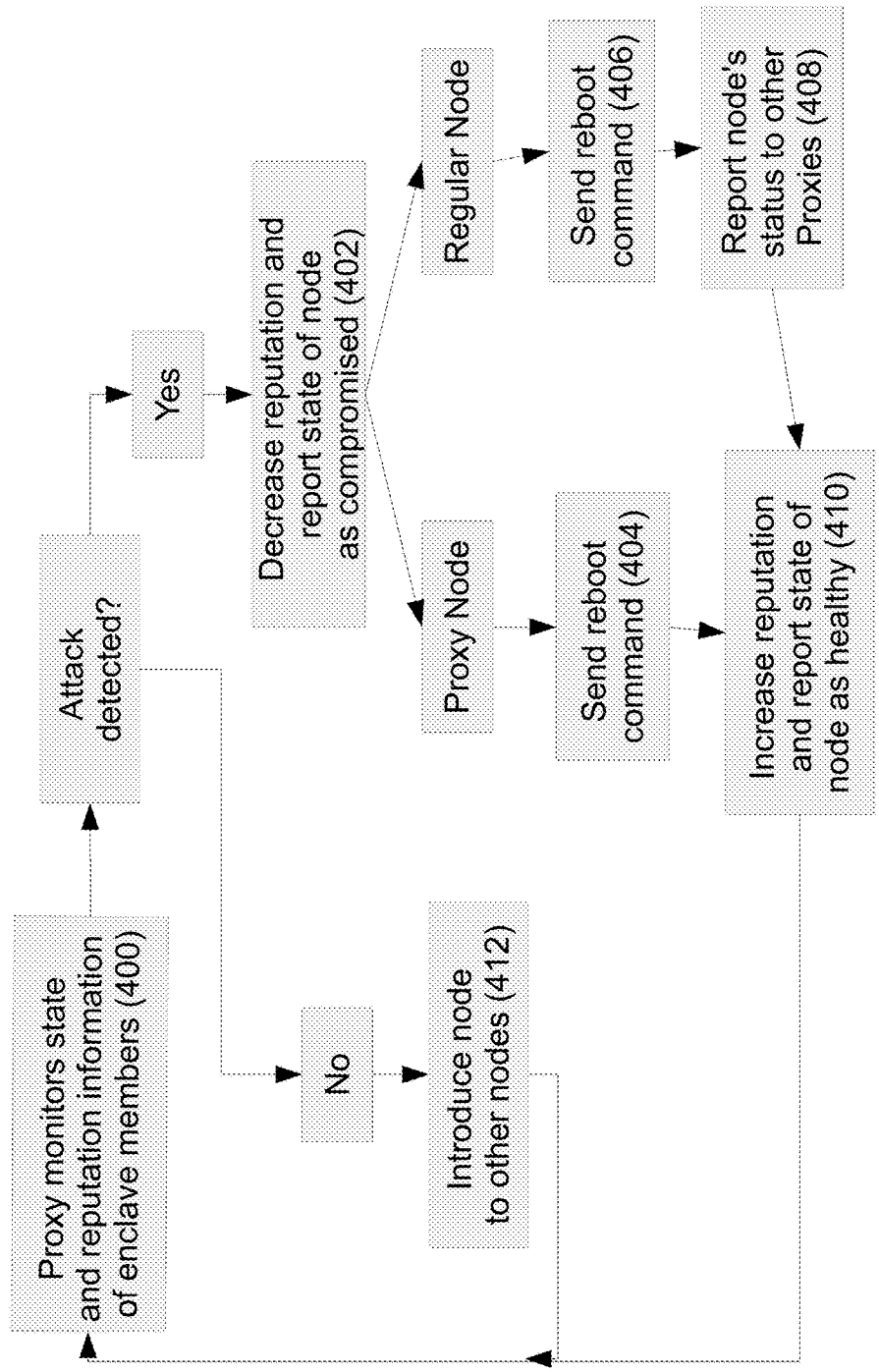
FIG. 4 is a flowchart showing the processing according to one embodiment.

Referring to FIG. 4, a flowchart of the processing according to one embodiment is shown. More particularly, a proxy is paired with one or more nodes in an enclave. In one embodiment of the present disclosure, the proxy monitors the state and reputation of the member nodes over time (400). When an attack is detected in one or more nodes, the proxy may decrease the reputation of the one or more nodes and report the state of the one or more nodes as compromised (402). If the attacked node is a proxy node, the proxy may send a reboot commend (404). If the attacked noted is a regular node, the proxy may send a reboot command (406) and report the attacked node's status to other proxies (408). Once a reboot commend has been sent, the proxy can increase the reputation of the now restored node and report its state as healthy (410). While a node is rebooting its state is off-line (not shown). If no attack is detected, a proxy may introduce nodes to each other (412) as described previously.

The disclosure and all of the functional operations described herein can be implemented in digital electronic circuitry, or in computer hardware, firmware, software, or in combinations of them. The disclosure can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the disclosure can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array), an ASIC (application-specific integrated circuit), or the like.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

One exemplary use of the present disclosure is in a vehicular system. For example, a modern automobile consists of 40-100 ECUs (Electronic Control Units, i.e., computers) connected over a common bus (the CAN bus). These computers can be considered to be in functional enclaves, e.g., powertrain, braking system, information system (entertainment), navigation system and telemetry, and communication system. As configured in current autos, all computers can communicate with all other computers regardless of enclave. A demonstrated security flaw in these modern autos involves compromising the CD player in the entertainment enclave such that it sends rogue messages to the telemetry system causing, e.g., the speedometer to show a parked car as moving at 120 MPH (though in theory much more dangerous messages could be sent). Using the disclosed invention, each ECU in the car can be protected by a proxy which can be used to monitor for infected devices and also to monitor for inappropriate communications between ECUs. For example, the braking system should not be sending control messages to the throttle, nor should the entertainment systems be sending control messages to any enclave involved with automobile motion. In this case, the proxies allow the disclosed system to: 1. isolate rogue ECUs that are attempting to send messages to enclaves they should not be influencing and/or 2. isolate entire enclaves from one and other to provide virtual segmentation on the single logical automobile communications network all while preventing propagation of any malicious code attacks.

In another potential application, a cluster of nodes is a UAV swarm deployed on a battlefield and providing logistics support and targeting. The deployed assets are configured to operate in an autonomous mode, but there are benefits to the drones communicating with each other, especially in GPS denied environments. If such a drone is affected by some uploaded virus or otherwise compromised, the other drones would seek to remove that drone from the cluster until it has been shown to be clean such as scrubbed of the virus, rebooted, or the like. In some embodiments, new drones might also be added to the cluster but only after passing the requirements detailed herein, such as reputational screening. Other examples of the system might include commercial drones performing inspections or delivering packages, autonomous vehicles and cloud computing. In each of these applications, the usage of reputation and the ability to repair the reputation of a new or previously dysfunctional asset is a unique feature detailed herein.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of protecting at least one networked enclave, comprising,
providing a proxy node per networked enclave, wherein the proxy node of the networked enclave comprises a timer and is configured to communicate with other networked enclaves via a respective proxy node;
the networked enclaves comprising electronic control units of a vehicle;
providing one or more regular nodes per networked enclave, wherein the proxy node establishes a connection between the one or more regular nodes within a networked enclave and establishes the connection between the one or more regular nodes of the other networked enclaves via their respective proxy node;
monitoring a state of the proxy nodes or regular nodes, wherein the proxy nodes and regular nodes have reputations and states, where said states include at least healthy, compromised, and off-line;
detecting an attack on the proxy nodes or regular nodes;
isolating the one or more attacked nodes;
cleansing the one or more attacked nodes by sending a reboot message via the proxy node of the networked enclave to the one or more attacked nodes within the networked enclave or to a respective proxy node of another networked enclave;
reducing the reputation of the one or more attacked nodes; and
rebooting the one or more attacked nodes to restore the state of the one or more attacked nodes to healthy.

2. The method of protecting the networked enclave of claim 1, further comprising increasing the reputation of the one or more attacked nodes a period of time after the attacked node has been rebooted.

3. The method of protecting the networked enclave of claim 1, further comprising reporting the attack to the proxy node.

4. The method of protecting the networked enclave of claim 1, further comprising
controlling communication between proxy or regular nodes by requiring the proxy nodes or regular nodes to have a reputation above a threshold value, wherein the reputation of a node is decreased after an attack, and is increased following a reboot or following a period of time between attacks.

5. The method of protecting the networked enclave of claim 1, wherein at least one of the proxy nodes is a secure proxy.

6. The method of protecting the networked enclave of claim 5, wherein the secure proxy is in the form of a dongle installed on a machine.

7. A cyber situational awareness subsystem for providing uncompromised host health status comprising,
one or more networked enclaves, the networked enclaves comprising electronic control units of a vehicle;
one or more nodes present in each of the one or more networked enclaves, wherein the one or more nodes are regular nodes or proxy nodes comprising a timer and wherein the one or more regular nodes and proxy nodes have a reputation and a state;
the one or more nodes being configured to communicate with others of the one or more nodes based on the respective reputation and state via a proxy node per each networked enclave; and
one of the one or more proxy nodes being a secure proxy;
one or more of the nodes being configured to detect an attack on the one or more nodes and to send a reboot message to the one or more nodes within a particular networked enclave, via the proxy node of that networked enclave.

8. The cyber situational awareness subsystem of claim 7, wherein the one or more nodes configured to detect an attack on the one or more nodes are external to the one or more proxy nodes.

9. The cyber situational awareness subsystem of claim 7, wherein communication between the one or more regular nodes and proxy nodes requires facilitation by a proxy node.

10. The cyber situational awareness subsystem of claim 7, wherein communication between the one or more nodes occurs only when the one or more nodes have reputations above a threshold value, wherein the reputation of a node is decreased after an attack, and is increased following a reboot or following a period of time between attacks.

11. The cyber situational awareness subsystem of claim 7, wherein communication between the one or more nodes occurs between proxies of different enclaves.

12. The cyber situational awareness subsystem of claim 7, wherein the secure proxy is in the form of a dangle installed on a machine.

13. The cyber situational awareness subsystem of claim 7, wherein the state includes at least healthy, compromised and offline.

14. A computer program product, tangibly stored on a non-transitory computer-readable medium, the product comprising instructions operable to cause a programmable processor to perform cyber situational awareness operations comprising:
identifying a proxy node per a networked enclave, wherein the proxy node comprises a timer;
identifying one or more regular nodes per the networked enclave, the networked enclaves being located on one or more unmanned aerial vehicles (UAV);
monitoring a state of the proxy nodes or regular nodes, wherein the proxy nodes and regular nodes each have reputations and states, where said states include at least healthy, compromised, and off-line;
detecting an attack on the proxy nodes or regular nodes;
isolating the one or more attacked nodes;
reducing the reputation of the one or more attacked nodes;
cleansing the one or more attacked nodes by sending a reboot message via the proxy node to the one or more attacked nodes within the networked enclave or to one or more attacked nodes in a neighboring networked enclave via a respective proxy node; and
rebooting the one or more attacked nodes to restore the state of the one or more attacked nodes to healthy.

15. The computer program product of claim 14, further comprising instructions for reporting the attack to the proxy node.

16. The computer program product of claim 14, further comprising instructions for increasing the reputation of the one or more attacked nodes a period of time after the attacked node has been rebooted.

17. The computer program product of claim 14, further comprising instructions for controlling communication between proxy or regular nodes by requiring the proxy nodes or regular nodes to have a reputation above a threshold value, wherein the reputation of a node is decreased after an attack, and is increased following a reboot or following a period of time between attacks.

18. The computer program product of claim 14, wherein at least one of the proxy nodes is a secure proxy and the secure proxy is in the form of a dongle installed on a machine.

* * * * *